March 11, 1947.　　　J. T. DICKSON　　　2,417,156
FLUID ACTUATED BRAKE
Filed Feb. 9, 1945　　　3 Sheets-Sheet 1

INVENTOR.
James T. Dickson
BY
Attorney

March 11, 1947.  J. T. DICKSON  2,417,156
FLUID ACTUATED BRAKE
Filed Feb. 9, 1945  3 Sheets-Sheet 2

INVENTOR.
James T. Dickson,
BY
Attorney.

March 11, 1947.  J. T. DICKSON  2,417,156
FLUID ACTUATED BRAKE
Filed Feb. 9, 1945  3 Sheets-Sheet 3

INVENTOR.
James T. Dickson,
BY
Attorney.

Patented Mar. 11, 1947

2,417,156

UNITED STATES PATENT OFFICE 2,417,156

FLUID ACTUATED BRAKE

James T. Dickson, Los Angeles, Calif.

Application February 9, 1945, Serial No. 577,075

4 Claims. (Cl. 188—72)

1

This invention relates to improvements in fluid actuated brakes or torque transmitters, an object being to provide improved means for separably holding the friction retarding elements assembled in a self contained brake working unit. My improvement is applicable to truck and other vehicle wheels of heavy or light weight and particularly to braking means which is fluid actuated. My improvement is more particularly adapted for separably holding fluid actuated friction disk members assembled as a self contained unit, said disk members being of that general type disclosed in my companion application, Serial No. 552,707, filed September 4, 1944. In said application the friction disk members by which braking action is applied are held assembled by annular frame members which are bolted together and are not readily accessible and which necessitate considerable time and labor to disassemble and reassemble. The present improvement provides improved means by which the parts are rendered readily accessible and disassembly and reassembly is accomplished more readily and with less work on the part of the operator. To these ends and with other objects and advantages in view my invention comprises the features of construction and combination of parts hereinafter described and set forth in the appended claims.

Figure 1:
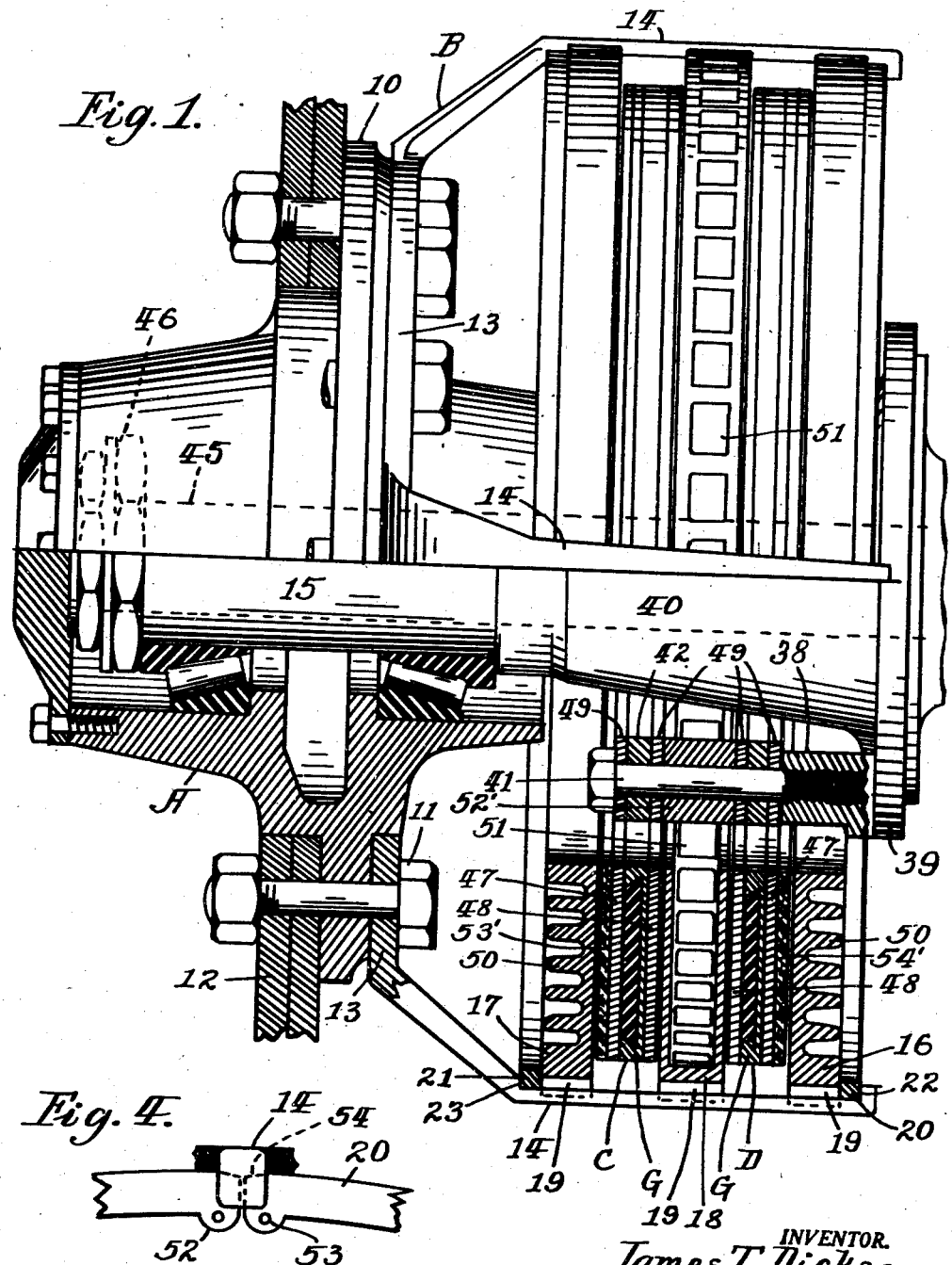
Figure 2:
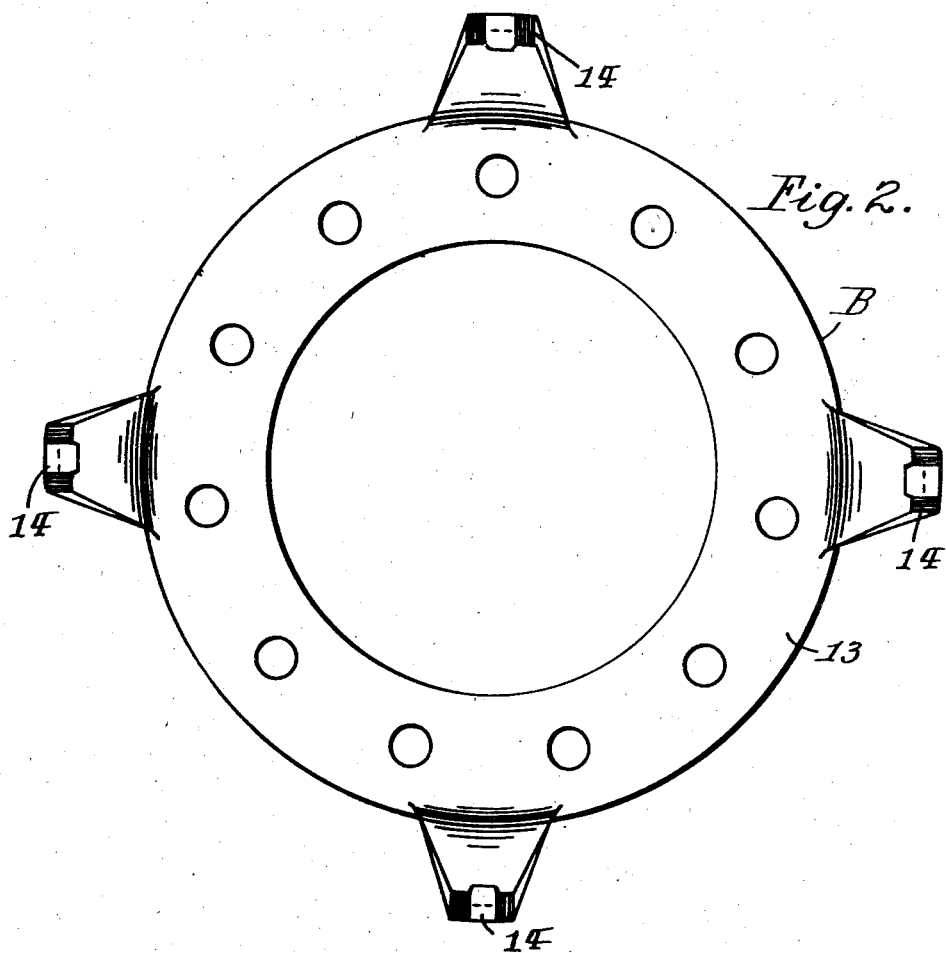
Figure 3:
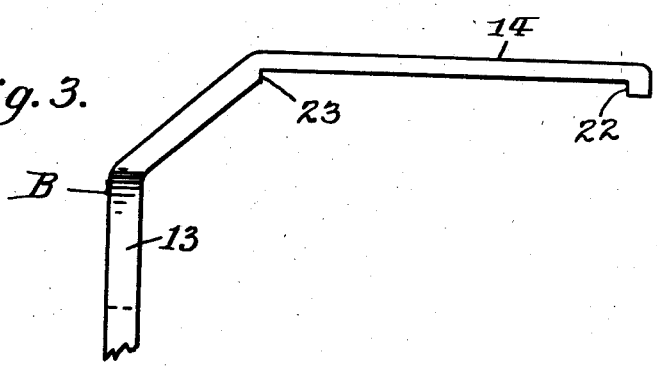
Figure 5:
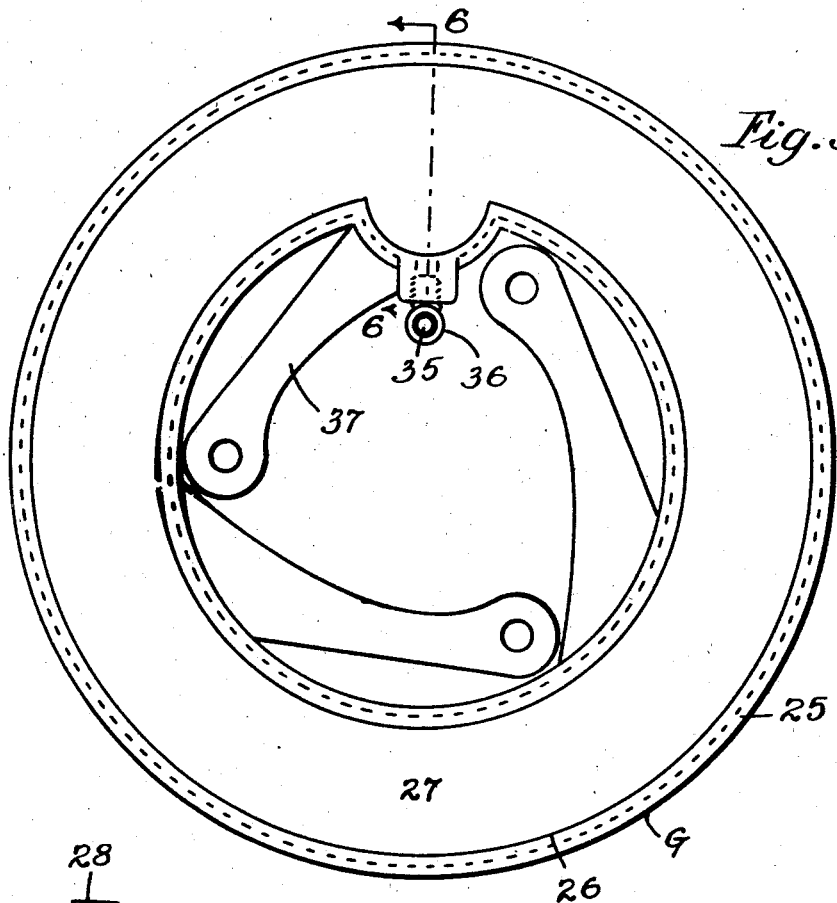

In the accompanying drawings forming part of this specification, Figure 1 is a side elevation, partly in vertical section of a detail portion of a vehicle and its wheel structure, together with its fluid actuated brake to which my improvement is shown applied; Fig. 2 is a plan of the spider frame by which the fluid actuated brake elements are held assembled together in operative position as a unit; Fig. 3 is a side elevation of a detail showing one of the arms on a portion of the body of the spider; Fig. 4 is a detail looking at the outermost end of one of the arms of the spider showing the ends of one of the split locking rings engaged for separably holding the brake elements assembled as an operating unit; Fig. 5 is a plan of one of the friction disks when removed from the brake assembly shown in Fig. 1, and Fig. 6 is a section of a detail taken on the line 6—6 of Fig. 5.

In the drawings, A indicates part of the hub portion of a wheel structure upon which one or more wheels (not fully shown) carrying one or more tires are mounted in the usual manner. The hub portion of the wheel structure is shown provided with an annular radiating flange 10 to the opposite sides of which are secured such as by bolts 11, the plate element 12 of the wheel structure and the annular body 13 of spider B. This spider is formed with a cluster of longitudinal spider arms 14 which extend parallel with the axis of the usual hollow stationary axle 15 upon which the wheel structure is journaled. The spider arms 14 are of any number desired and are spaced circumferentially so as to hold the members of one or more brake elements together as a self contained brake unit, the drawings illustrating four spider arms and the brake unit having two brake elements C and D. These brake elements are somewhat similar to the corresponding units described in my companion application above identified, each brake element containing a fluid pressure applicator such as G.

The brake elements are substantially similar, each being composed of outer annular substantially flat friction plates 16 and 17 and a corresponding middle friction plate 18, which assume suitably spaced position to receive the brake applicators to be hereinafter described. The perimeters of the friction plates 16, 17 and 18 are slidably engaged in grooves 19 by the arms 14 of the spider to impart revolution, with the spider and wheel structure. The friction plates are held by the spider arms 14 which slidably engage their perimeters, and by split expansible lock rings 20 and 21, which latter are retained by inner shoulders 22 and 23 in the outer and inner ends of the spider arms 14 as shown.

Figure 6:
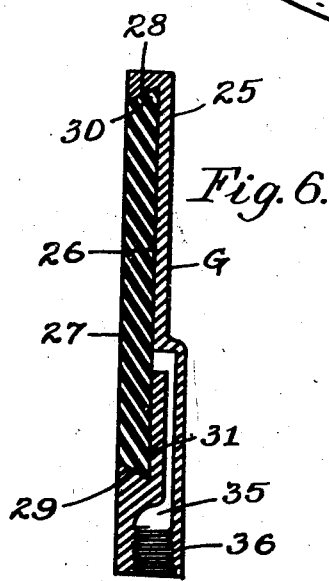

Each brake element C and D contains the fluid pressure applicator G, which resembles an annulus 25 (Figs. 5 and 6). One exterior side of said annulus is substantialy flat and the opposite side is provided with a shallow broad annular groove 26 in which a corresponding flat annular elastic, self sealing fluid pressure applying band 27 is seated. The radial inner and outer edges of the groove are mortised or under cut to provide inner and outer clinching shoulders 28 and 29 entirely around the band, and the elastic band is provided with corresponding inner and outer annular beveled tongues 30 and 31, in close fitting interlocking engagement in said channels to normally hold the band in the applicator and prevent pressure fluid leaking from between the band 27 and annulus 25 when the applicator is inflated. When desired the mortised edges of the band can be cemented to the undercut channels 28 and 29 to assure tight sealing engagement. In this manner the greater the pressure exerted by the inflation fluid the tighter the seal. An inwardly extending duct 35, connecting with the space between the inner surface of the band and annulus, terminates in a union 36, by which a source of fluid pressure can be applied to the applicators of both brake elements for controlling the operation of the brakes. In this manner either or both applicators can be employed for applying braking action.

Each annulus 25 is anchored or supported by inner flexible arms 37 (Fig. 5), the free passaged ends of which are adapted to be secured to the threaded bosses such as 38 on the annular stationary flange support 39 of the usual axle housing 40, by bolts such as 41 (Fig. 1), and suitable spacers 42, said flange support being integral with the axle housing 40 and relatively stationary. The three flexible supporting means on each applicator of the brake units, provides a substantial and equalized mounting for the brake applicator units. The portions of the inner and outer applicators G containing the unions 36 may also be suitably spaced circumferentially apart to provide convenient couplings for the connection of controlling fluid to the applicators. The body of the applicator may be made out of light weight metal to advantage or any other suitable resilient material. Also the fluid pressure applying band 27 may be made out of rubber or any other suitable resilient material.

The hub portion A forming part of the wheel structure constitutes part of the driven member upon which one or a plurality of wheels, with their tires are detachably mounted and is connected in the usual manner with the usual driving shaft 45 by the usual end coupling 46, this means representing one of many usual forms of driven units to which my invention is applicable. The friction plates 16, 17 and 18 are connected with the driven member A by the spider and lock rings as described and revolve with the wheel structure while the brake elements C and D, which cooperate with the friction plates, and are normally fixed on the axle housing apply braking action to retard the revolution of the driven member. Frictional engagement is applied to retard the revolution of the driven element by the fluid pressure applicators G, which are normally held by their spring arms in median non-revoluble position through their connections with the axle housing 40 and dead axle member 15. Each pressure applicator is provided with suitable flat wear disks 47, 48, a set of said disks being non-revoluble and supported in each brake element C or D by integral spring arms which are substantially similar in construction to the arms 37 on the fluid pressure applicator G (Fig. 5), through the inner spring end portions 49 thereof by the bolts such as 41 on the relatively fixed bosses 38. These wear disks are normally held with their friction faces out of contact with the corresponding inner friction surfaces of the friction plates 16, 17 and 18, in proximity to the sides of the brake elements E and F and are adapted to be pressed outwardly to apply frictional engagement with the walls of the corresponding friction plates by the inflation of the companion fluid pressure applicators G. A suitable spacer 52' is placed on the bolt 41 to hold the arms of the applicators G and disks 47 and 48 in normal position. The disk surfaces next to the outermost friction plates 16 and 17 are shown provided with composition anti-wear disks 53' and 54' as shown, which are cemented or otherwise attached to the surfaces of the friction disks to prolong the life of the wear surfaces of the brake elements. The outer side surfaces of the friction plates 16 and 17 are provided with annular heat radiating fins 50 and the middle friction plate 18 is passaged at 51, to effectively cool the working parts of the device.

To dismantle and reassemble the brake elements, the wheel structure is first removed in the usual manner by releasing the coupling elements 46. The brake holding bolts 41 are also removed and the wheel structure including the self contained brake assembly is then free to be slid off of the dead axle 15 and axle housing 40. After removal the lock ring is released and removed leaving the brake elements C and D, including the friction plates 16, 17 and 18 free to be disengaged and removed from the spider frame. In this manner the parts of the brake elements can be easily and readily renewed and reassembled.

To facilitate removing or adjusting the split lock rings the ends of the latter may be constructed with bosses 52 in which tool engaging draw bores 53 are provided. The ends of the rings are also formed with beveled shoulders 54 which engage corresponding shoulders in an arm of the spider (Fig. 4), to self center the ends of the ring in engagement with said arm.

In accordance with the patent statutes, I have described the principles of operation of my improvement together with the construction thereof which I now consider to represent the best embodiment thereof, but I desire to have it understood that the construction shown is only illustrative and that the invention can be carried out by other means and applied to uses other than those above set forth within the spirit of the invention and within the scope of the following claims.

I claim:

1. A brake structure, comprising, a stationary axle element, a driven wheel structure removably mounted upon said axle element and journaled to revolve freely about its axis, an annular spider having a transverse base mounted upon said wheel structure and revoluble coaxially therewith and a plurality of arms extending longitudinally from said base and to the axis of the wheel structure and spaced circumferentially apart, a brake unit between the arms of said spider and coaxial with said wheel structure and axle element, a split lock ring removably engaged within the outer ends of said arms to removably retain the brake unit engaged by said arms, said brake unit having a driven element anchored to said wheel structure to revolve therewith, a companion brake retarding element anchored to said stationary axle element and a fluid pressure applicator interposed between said brake driven and retarding elements.

2. A brake structure, comprising, a stationary axle, a driven wheel structure removably mounted upon said axle and journaled to revolve freely about its axis, an annular spider having a base portion mounted upon said wheel structure and revoluble coaxially therewith and a plurality of arms extending longitudinally from said base and to the axis of the wheel structure and spaced circumferentially apart, a brake unit within the arms of said spider and coaxial with said wheel structure and axle, shoulder means in the end portions of said arms, and split expansible lock ring means removably engaged by said shoulder means within said arms for releasably holding the brake unit therein.

3. In a structure as defined in claim 2, the shoulder means comprising an annular set of shoulders in each of the inner and outer end portions of said arms and the split expansible lock ring means comprising a pair of split rings, one being releasably engaged by the inner set of shoulders and the other being releasably engaged by the outer set of shoulders.

4. In a structure as defined in claim 2, the expansible lock means comprising an expansible split ring having adjacent ends formed with beveled portions and one of the arms of the spider having corresponding shoulders with which the beveled ends on the split ring are adapted to engage and self center said ring, and the ends of the ring having tool engaging bores.

JAMES T. DICKSON.

REFERENCES CITED

The following references are of record in the file of this patent:

UNITED STATES PATENTS

| Number | Name | Date |
|---|---|---|
| 2,190,767 | Benson | Feb. 20, 1940 |
| 2,099,489 | Lambert | Nov. 16, 1937 |